United States Patent [19]

Chute et al.

[11] 4,034,560

[45] July 12, 1977

[54] CENTRIFUGAL FLOW GAS TURBINE ENGINE WITH ANNULAR COMBUSTOR

[75] Inventors: Richard Chute, Hungtinton Woods, Mich.

[73] Assignee: Eaton Corporation, Cleveland, Ohio

[21] Appl. No.: 214,703

[22] Filed: Jan. 3, 1972

[51] Int. Cl.² .................... F02C 3/08; F02C 7/06; F02C 7/22

[52] U.S. Cl. .............................. 60/39.08; 416/174; 417/406; 308/184 R; 60/39.32; 60/39.36; 60/39.74 S; 60/39.66; 415/142; 415/180; 415/219 C

[58] Field of Search ........ 60/39.36, 39.09, 39.74 S, 60/39.32, 39.06, 39.65, 39.08, 39.31; 417/406, 407, 408, 409; 415/180, 142, 122 R, 219 C, 207, 117 A; 416/92, 174; 308/184 R

[56] References Cited

U.S. PATENT DOCUMENTS

| | | | |
|---|---|---|---|
| 2,406,388 | 8/1946 | Larrecq | 417/409 |
| 2,446,013 | 7/1948 | Kuyper | 60/39.09 R |
| 2,508,260 | 5/1950 | Holley | 60/39.09 R UX |
| 2,578,501 | 12/1951 | Boosinger | 60/39.09 R |
| 2,748,568 | 6/1956 | Budworth | 60/39.36 |
| 2,856,755 | 10/1958 | Szydlowski | 60/39.36 |
| 2,922,278 | 1/1960 | Szydlowski | 60/39.36 |
| 2,945,349 | 7/1960 | Ritzi | 60/39.36 |
| 3,005,668 | 10/1961 | Szydlowski | 308/184 R |
| 3,011,311 | 12/1961 | Williams et al. | 60/39.36 |
| 3,021,675 | 2/1962 | Schroeder | 60/39.74 S |
| 3,115,011 | 12/1963 | Deinhardt et al. | 60/39.36 |
| 3,116,908 | 1/1964 | Wosika | 60/39.36 UX |
| 3,126,703 | 3/1964 | Oprecht | 60/39.36 |
| 3,199,294 | 8/1965 | Hagen | 60/39.31 |
| 3,205,024 | 9/1965 | Morley et al. | 308/184 R |
| 3,240,016 | 3/1966 | Price | 60/39.74 S X |
| 3,263,907 | 8/1966 | Van Nimwegan et al. | 308/184 R |
| 3,304,713 | 2/1967 | Szydlowski | 60/39.36 X |
| 3,321,912 | 5/1967 | Oprecht | 60/39.36 |
| 3,326,453 | 6/1967 | Kun | 417/407 UX |
| 3,416,723 | 12/1968 | Schmitz et al. | 417/409 X |
| 3,574,478 | 4/1971 | Toth et al. | 415/170 A |

FOREIGN PATENT DOCUMENTS

| | | | |
|---|---|---|---|
| 611,142 | 12/1960 | Canada | 60/39.36 |
| 1,108,987 | 6/1961 | Germany | 417/406 |
| 1,276,967 | 9/1968 | Germany | 60/39.36 |
| 745,202 | 3/1944 | Germany | 417/409 |
| 342,036 | 10/1959 | Switzerland | 60/39.08 |

Primary Examiner—Carlton R. Croyle
Assistant Examiner—Robert E. Garrett
Attorney, Agent, or Firm—Teagno & Toddy

[57] ABSTRACT

A small gas turbine engine having a small, high speed shaft assembly including a central shaft member, a radial outflow compressor rotor secured to one end of the central shaft member with its inlet end disposed outboard of the shaft assembly, and a radial inflow turbine rotor secured to the other end of the central shaft member with its discharge end disposed outboard of the shaft assembly. The shaft assembly is supported at its ends, outboard of the rotors, by a pair of bearings which are axially secured but allow limited radial movement of the shaft assembly. An annular combustor is disposed between the turbine and compressor rotors in encircling relation to the central shaft member. Fuel is supplied to the combustor chamber from the exhaust end of the turbine through an axial passage in the shaft assembly opening at one end outboard of the exhaust end bearing and communicating at its other end with radial ports in the central shaft member arranged to sling fuel into the combustor chamber. The shaft assembly housing comprises two cast sections which are coupled together to enclose the combustor with the end portion of each housing section shaped to define a shroud for the radial blades of the turbine and compressor rotors, respectively. A cast nozzle plate and a diffuser plate are secured to the respective housing sections. The nozzle and diffuser plates each include an annular outer portion defining the vanes for the turbine and compressor rotors, respectively, and a central hollow hub portion embracing the central shaft member of the shaft assembly; the inboard ends of the two hub portions are axially spaced to expose the radial ports in the central shaft member and allow slinging delivery of fuel into the combustor. An annular air inlet to the compressor rotor spaces the shaft assembly housing from a transmission housing, and the compressor end of the shaft assembly is coupled, outboard of the compressor end bearing, to speed reduction gearing journalled within the transmission housing.

2 Claims, 7 Drawing Figures

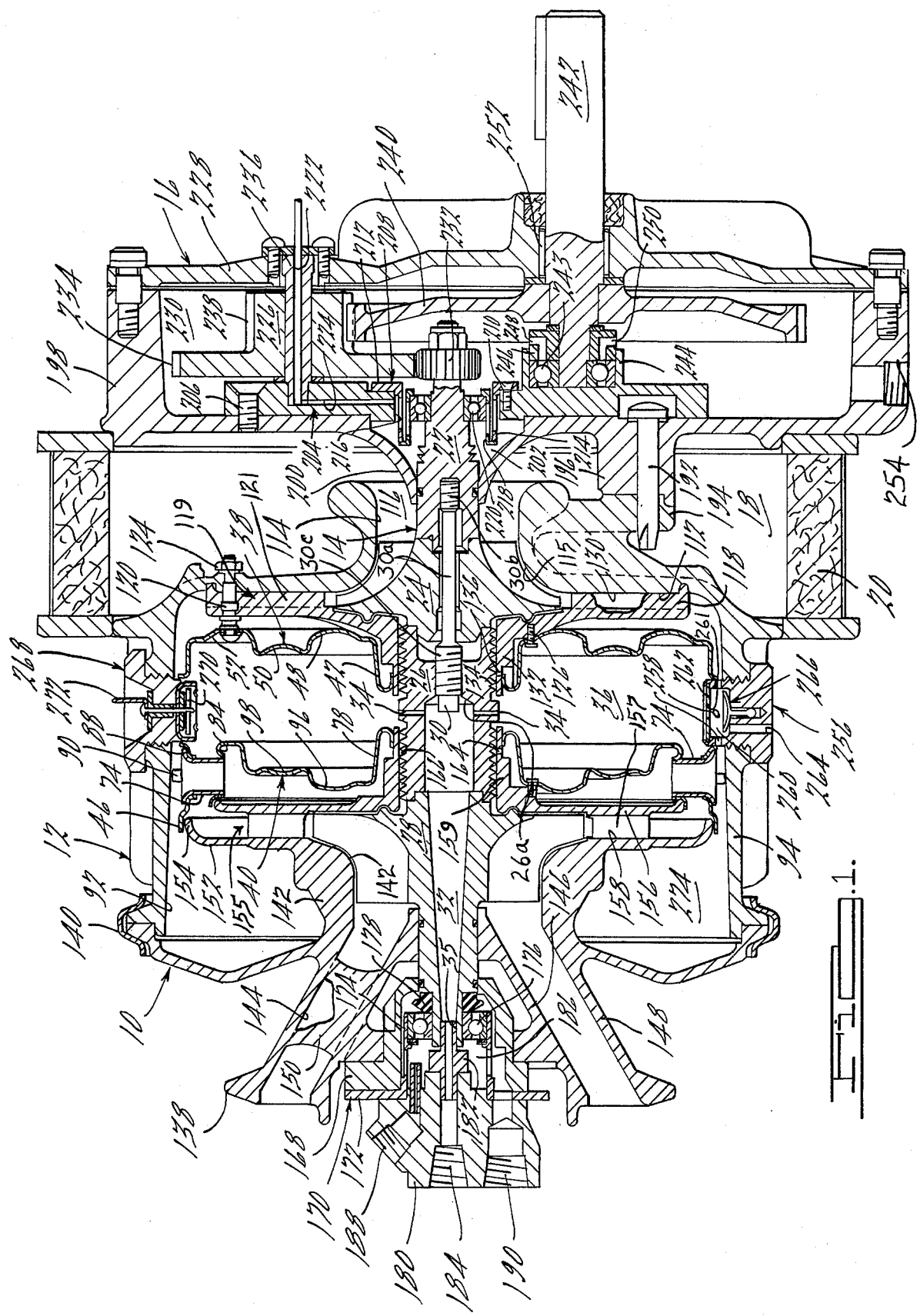

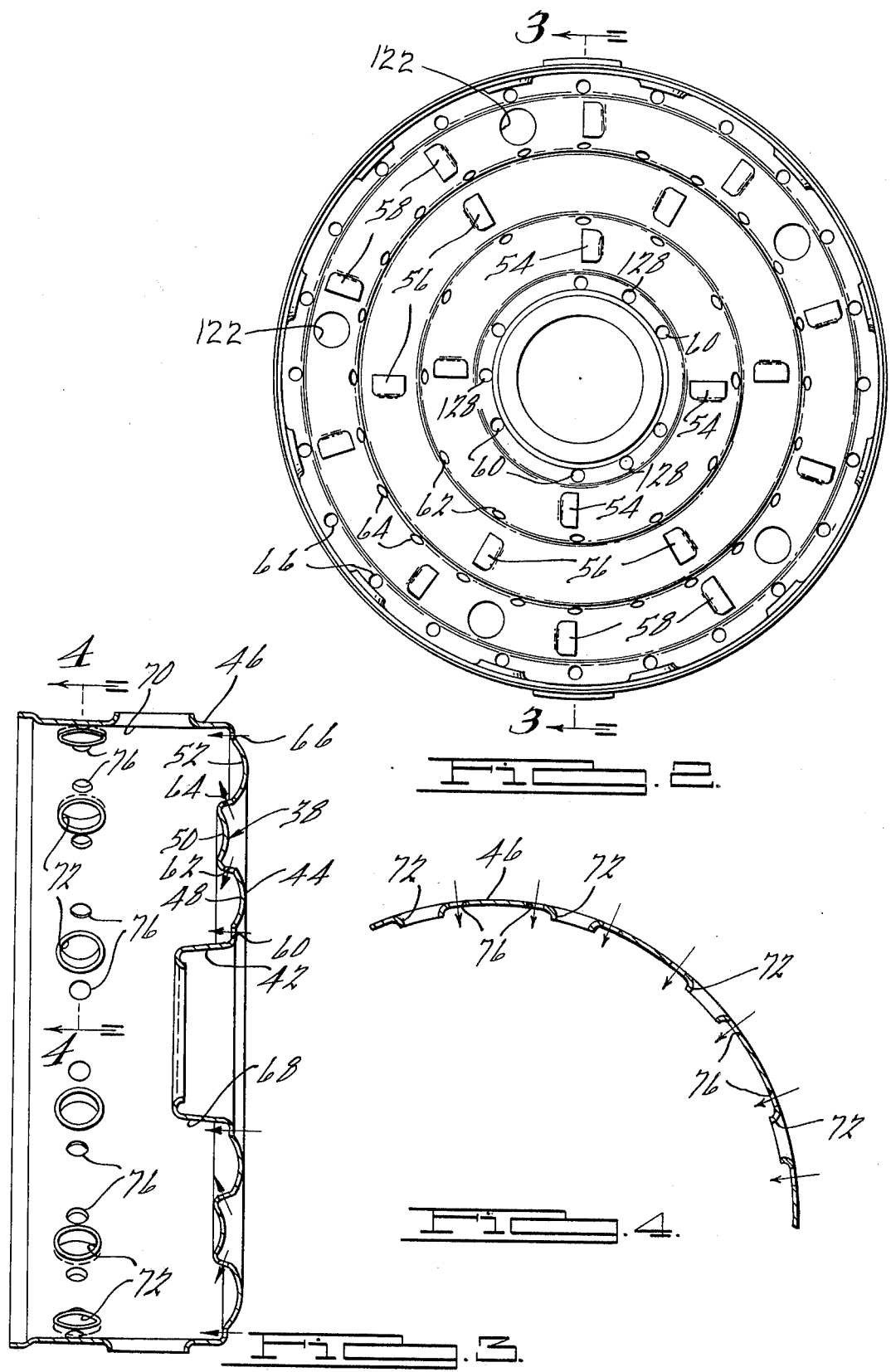

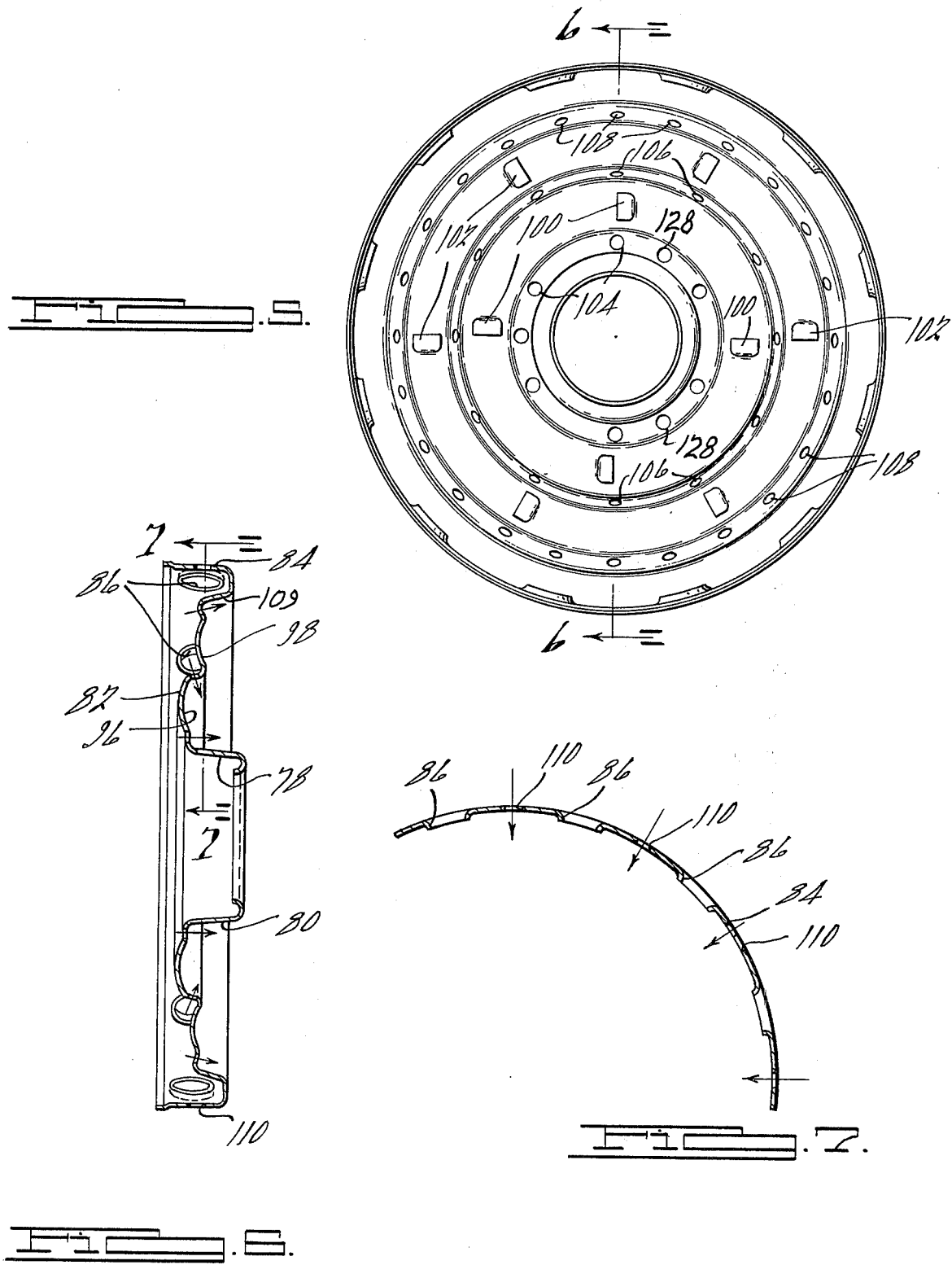

CENTRIFUGAL FLOW GAS TURBINE ENGINE WITH ANNULAR COMBUSTOR

BACKGROUND OF THE DISCLOSURE

Anti-pollution laws create grave problems with respect to the continued use of internal combustion engines. The new laws establish regulatory authority with respect to all engines rather than to only automobile size engines. Exhaust emission standards for small power ranges, e.g. 15 to 50 horsepower, are foreseen as a natural consequence of these laws.

Inherently, a gas turbine engine is a low air polluting device. A major drawback, however, to the large usage of small gas turbines is their high cost relative to comparable size reciprocating engines. If such costs could be significantly reduced without a sacrifice in efficiency, it is considered that gas turbines in the 15 to 50 horsepower range could displace the reciprocating engine in many product areas.

It is accordingly a primary object of the present invention to provide a small gas turbine engine which, while at least as efficient as known designs, is considerably less expensive to manufacture.

BRIEF SUMMARY OF THE INVENTION

The invention engine is of the single shaft type and includes a small high speed shaft assembly comprising a central shaft member, a radial turbine rotor at one end of the shaft member, and a radial compressor rotor at the other end of the shaft member. An annular combustor encircles the central shaft member between the turbine and compressor rotors.

Many engine design features contribute to the simple, inexpensive and efficient nature of the invention engine.

According to one design feature of the invention engine, fuel is delivered to the combustor through an axial passage which extends through the turbine end of the shaft assembly and terminates in radial ports in the central shaft member arranged to sling fuel into the combustor.

According to a further feature of the invention engine, the end of the shaft assembly opposite the end through which fuel is delivered is coupled to a speed reducing transmission so that fuel is delivered through one end of the shaft assembly while power is taken off of the other end of the shaft assembly. In the disclosed embodiment, fuel enters through the turbine end and power is taken off at the compressor end.

According to another feature of the invention engine, the compressor end of the shaft assembly is coupled to a speed reducing transmission and the shaft assembly is supported in a suitable housing by a pair of outboard bearings with one bearing disposed outboard of the turbine rotor and the other bearing disposed between the compressor rotor inlet and the coupling of the shaft assembly to the speed reducing transmission.

According to still another feature of the invention, the turbine rotor is a radial inflow unit arranged with its discharge outboard of its inlet, the bearing supporting the turbine end of the shaft assembly is disposed outboard of the turbine rotor discharge in the path of the hot exhaust gases from the turbine, and the incoming fuel is passed axially through this bearing for cooling purposes.

According to yet another feature of the invention, the shaft assembly housing comprises two case sections which are coupled together to enclose the combustor with the end portion of each housing section shaped to define a conforming shroud for the radial blades of the turbine and compressor rotors, respectively. The end portion of the housing section associated with the turbine rotor is further shaped to provide a horn or funnel portion which centrally supports the turbine end bearing and defines an annular exhaust passage around this bearing.

According to a further feature of the invention, a cast nozzle plate and diffuser plate are secured, respectively, to the two cast housing sections; the nozzle and diffuser plates each includes an annular outer portion defining the vanes for the turbine and compressor rotors, respectively, and a central hollow hub portion embracing the central shaft member of the shaft assembly. The inboard ends of the two hub portions are axially spaced to expose the radial ports in the central shaft member and allow slinging delivery of fuel to the combustor.

According to another feature of the invention, the combustor comprises two annular stampings with the radially inner periphery of each stamping seated around a respective hub portion of the nozzle and diffuser plates.

According to still another feature of the invention, the radially outer peripheries of the combustor stampings are arranged in concentric, radially spaced relation to define an annular, axially extending exit passage for the combustor gases, the turbine end nozzle plate and associated housing section define an annular, radially extending passage leading to the nozzle vanes surrounding the turbine rotor, and the radially, outer peripheries of the combustor stampings seat on concentric, radially spaced surfaces defined by the turbine end nozzle plate and the associated housing section at the entrance to the radially extending passage leading to the turbine rotor nozzle vanes.

According to a still further feature of the invention, a plurality of circumferentially spaced pairs of radially aligned openings are provided in the portions of the combustor stampings defining the annular, axially extending exit passage from the combustion chamber, and a short sheet metal tube is slip fitted in each pair of radially aligned openings. In the disclosed embodiment, each tube includes a tab at its radially outer end abuttingly engaging the adjacent inner housing surface to maintain the tubes in position and facilitate assembly.

These and other objects, features and advantages of the present invention will become apparent from the drawings and from the detailed description of a preferred embodiment of the invention.

BRIEF DESCRIPTION OF THE DRAWINGS

FIG. 1 is a fragmentary, side elevational view, in section, of a gas turbine engine according to the invention, taken on an axial plane passing through the center of the engine.

FIG. 2 is an end view of one part of the combustor embodied in the turbine of FIG. 1.

FIG. 3 is a sectional view taken on lines 3—3 of FIG. 2.

FIG. 4 is a sectional view taken on line 4—4 of FIG. 3.

FIG. 5 is an end view of another part of the combustor illustrated in FIG. 1.

FIG. 6 is a sectional view taken on line 6—6 of FIG. 5.

FIG. 7 is a sectional view taken on line 7—7 of FIG. 6.

DETAILED DESCRIPTION OF THE DRAWINGS

FIG. 1 illustrates a gas turbine engine 10 according to the invention. The engine, broadly considered, comprises a generally circular power section 12 and a generally circular speed reducing transmission 16. Transmission 16 is separated from power section 12 by an annular, radially extending air inlet 18 which is enclosed by an annular automobile type air filter 20.

Power section 12 includes an intake housing 94, an exhaust housing 138 and a shaft assembly 14 journalled within the housings. Shaft assembly 14 comprises four axially aligned sections. These sections include a forward or power takeoff shaft section 22, a radial outflow compressor rotor 24, a slinger ring or central shaft member 26, and a radial inflow turbine rotor 28. Slinger ring 26 and turbine rotor 28 have adjacent ends of complimentarily stepped configuration rigidly joined together by welding. A tie bolt 30, axially located relative to the four sections, has a center portion 30a freely passing through a suitable central bore in compressor rotor 24, an end 30b threadably received in a blind, tapped central bore in forward shaft section 22, and an end 30c threadably received in a tapped central through bore in a partition portion 26a of slinger ring 26. Adjacent ends of slinger ring 26 and compressor rotor 24, and forward shaft section 22 and compressor rotor 24, respectively, are complimentarily stepped and interlock upon tightening of tie bolt 30 to form a rigid shaft assembly.

A central, axially extending fuel supply passage 32 is provided in turbine rotor 28 and slinger ring 26. Passage 32 is conical in configuration through turbine rotor 28, diverging outwardly as it approaches slinger ring 26. Passage 32 is cylindrical in configuration in slinger ring 26 and communicates with the exterior of shaft assembly 14 through a plurality of circumferentially spaced, radially extending slinger ports 34 located in slinger ring 26. An opening 35 is provided in the turbine end of the shaft assembly for the introduction of fuel into passage 32; opening 35 also permits introduction of an appropriate tool to tighten or loosen tie bolt 30 which, for this purpose, is provided with a socket head presented in the portion of passage 32 located within slinger ring 26.

An annular combustion chamber or combustor 36 is disposed between the turbine and compressor rotors in encircling relation to slinger ring 26. Combustor 36 is defined by a line 37 which includes a forward section 38 and a rearward section 40.

As illustrated in FIG's. 2 to 4, forward section 38 includes an annular, axially extending radially portion 42 that is generally cylindrical in shape. A disk-like side portion 44 connected to the end of inner portion 42 extends radially outwardly and terminates at an axially extending radially outer portion 46 that is generally cylindrical in shape and encircles inner portion 42. Side portion 44 includes three spaced annular concave surfaces 48, 50 and 52 opening toward combustion chamber 36. Sets of louvers 54, 56 and 58 are struck from side portion 44 in equally spaced circles and provide directionally orientated passages respectively passing through surfaces 48, 50 and 52. Louvers 54 and 58 as viewed in FIG. 2 open in a counterclockwise direction into combustion chamber 36 while louvers 56 open in a clockwise direction into combustion chamber 36. The louvers permit the passage of air in a circular swirling motion along the annular concave surfaces into the combustion chamber 36 with adjacent louver sets providing opposed air currents. The air passing through the louvers is primarily intended to cool forward section 38, although it also aids combustion.

Concentrically located spaced passages 60, 62, 64 and 66 are positioned in side portion 44 to further facilitate the passage of air into combustion chamber 36. Passages 60 are located to direct an air flow across the exterior surface 68 of portion 42 while passages 66 are located to direct an air flow across the interior surface 70 of outer portion 46. Passages 62 and 64 are located to direct air currents into combustion chamber 36 and radially toward inner portion 42 and outer portion 46 respectively. For convenience, arrows have been located in FIG. 3 to show the direction of the respective air currents through passages 60, 62, 64 and 66. The air passing through these passages is primarily intended for combustion, although it also serves a cooling function with respect to forward section 38.

A plurality of circumferentially spaced thimble passages 72 are provided in outer portion 46 to receive burner thimbles 74 (FIG. 1). Small dilution passages 76 are provided each side of thimble passages 72 to direct air currents perpendicular to surface 70 of outer portion 46, as indicated by the arrows in FIG. 4.

Rearward section 40, as illustrated in FIG's. 5 to 7, includes an annular, axially extending radially inner portion 78 that is generally cylindrical in shape. A disk-like side portion 82 connected to inner portion 78 extends radially outwardly and terminates at an annular, axially extending radially outer portion 84 that is generally cylindrical in shape and encircles a part of inner portion 78.

As seen in FIG. 1, in assembly, outer portion 84 of rearward section 40 is concentric with and radially inwardly spaced from outer portion 46 of forward section 38. A plurality of thimble passage 86 (FIG. 7), equal in number and aligned in location to thimble passages 72 in forward section 38, are provided in outer portion 84. Thimble passages 72 and 86 are aligned in assembly to permit the location of a cylindrical or tubular thimble burner 74 in the opposing passages. Each thimble burner 74 is slip fitted within the respective passages 72 and 86 and has an annular lip 88 at one end to engage outer portion 46 of forward section 38 and prevent the movement of the thimble burner completely through the passages. A radially extending tab 90 on each thimble burner 74 is adapted to abuttingly engage interior surface 92 of intake housing 94 when annular lip 88 is engaged with forward section 38 to assist in the assembly of the combustor in the housing and prevent radial movement of the thimble burners during use of the engine.

Side portion 82 of rearward section 40 further includes a pair of spaced annular concave surface 96 and 98 intermediate inner and outer portions 78 and 84 opening toward combustion chamber 36. Struck sets of louvers 100 and 102 are equally spaced in circles around side portion 82 and provide directionally orientated passages respectively communicating with surfaces 96 and 98. As viewed in FIG. 5, louvers 100 open into combustion chamber 36 in a clockwise direction while louvers 102 open into chamber 36 in a counterclockwise direction. The louvers direct air along the respective annular concave surfaces in a swirling motion into combustion chamber 36 with louvers 100 providing air in one rotational direction and louver 102 providing air in the opposite rotational direction. The air passing through the louvers is primarily intended to cool rearward section 40. Preferably, as viewed from one end of combustion chamber 36, louvers 100 and 54 should swirl air in opposite directions as should louvers 102 and 56 to create a turbulence within combustion chamber 36.

Spaced passages 104, 106 and 108 are positioned in circles in side portion 82 of rearward section 40 to permit the passage of air into combustion chamber 36. Passages 104 are located to direct air currents across the exterior surface 80 of inner portion 78 while passages 106 are located to direct air currents radially into chamber 36 toward surface 80 of inner portion 78. Passages 108 are located to direct air currents across angular surface 109 of side portion 82 into chamber 36 and radially toward outer portion 84.

The purpose of the passages 60, 62, 64, 66, 104, 106 and 108 and the louvers 54, 56, 58, 100 and 102 is twofold. They are first intended to direct air coming into the combustion chamber 36 across forward and rearward sections 38 and 40 to cool these sections and, second, they are intended to create a turbulence within the combustion chamber 36 to provide proper fuel-air mixing and favorable combustion. The shape of sections 38 and 40 and the location of the louvers and passages are significant to the operation of an efficient engine producing the desired horsepower in the minimum space.

As seen in FIG. 7 a plurality of dilution passages 110 are located intermediate thimble passages 86 in outer portion 84 to direct air currents perpendicular to outer portion 84. In assembly, dilution passages 110 will be located intermediate to dilution passages 76 in outer portion 46 of forward section 38. The dilution passages 76 and 110 are intended to direct air currents into and cool the exhaust gases exiting the combustion chamber between outer portions 46 and 84.

Combustor sections 38 and 40, and thimbles 74, are formed as sheet metal stampings.

Intake housing 94 is cup shaped and has an annular axially extending portion 93 defining a cylindrical surface 92 that is concentric with the shaft assembly axis, and a radially extending portion 111 having an annular surface 112, and an axially extending cylindrical surface 114 concentric with the axis of shaft assembly 14, and a curvilinear annular surface 115 interconnecting surfaces 112 and 114. Surface 115 closely conforms to the outer curvilinear configuration of the blades of compressor rotor 24 to provide a shroud for these blades. An annular compressor inlet passage 116, communicating with air inlet 18, is defined between surface 114 and the adjacent exterior cylindrical surface of shaft assembly 14; passage 116 opens into the blading of compressor rotor 24. Housing 94 is preferably formed as an aluminum die casting.

An annular compressor diffuser plate 118 is secured to intake housing 94 by a number of bolts 120 which project through openings 122 in combustor forward section 38. Diffuser plate 118 includes an outer annular diffuser portion 119 defining a plurality of circumferentially spaced, generally radially extending diffuser vanes 121 projecting in cantilever fashion from the base section of portion 119, and a central hollow hub portion 132 encircling central shaft member 26 and extending axially inwardly from diffuser section 119. Bolts 120 are secured by nuts 124 located in air inlet 18 and further act to retain combustor forward section 38 at a given distance from diffuser plate 118 to form an air space therebetween. A plurality of screws 126 are located intermediate concave surface 48 and inner portion 42 in holes 128 in forward section 38 to further secure combustor section 38 to plate 118.

Diffuser plate 118, together with housing end surface 112, provides a plurality of radially extending passages 130 defined between adjacent vanes 121; passages 130 direct the flow of outlet air from compressor rotor 24. A labyrinthian seal 134 is formed on slinger ring 26 are terminates at a position adjacent a hub portion 32 to prevent the passage of air from compressor rotor 24 between diffuser plate 118 and shaft assembly 14. Diffuser plate 118 is preferably formed as an aluminum die casting.

The radially inner periphery of combustor forward section 38, as defined by the inturned axially inner edge of portion 42, seats on hub portion 132 and defines an annular air space between portion 42 and hub portion 132. The air space between forward section 38 and diffuser plate 118 communicates with the passages and louvers in forward section 38 and a plurality of radially extending passages 136 which open into labyrinthian seal 134. Air flow through passages 136 increases the effectiveness of seal 134.

Exhaust housing 138 is connected to the large open end of intake housing 94 by means of a known screw actuated "U" shaped clamp 140. An annular axially inwardly projecting portion 142 defining an annular curvilinear inner surface 142a which closely conforms to the outer curvilinear configuration of the blades of turbine rotor 28 to provide a shroud for these blades. Housing 138 further defines a conical exhaust passage 144 defined by inner and outer conical housing portions 146 and 148; portions 146 and 148 are interconnected by a plurality of circumferentially spaced spreaders or spokes 150. Exhaust passage 144 communicates with the outlet of turbine rotor 28 and the atmosphere to direct exhaust gases away from the engine. Inner portion 146 is annular in configuration and terminates proximate shaft 14. Exhaust housing 138 is preferably formed as a ductile iron casting.

Exhaust housing 138 further includes an annular disk shaped portion 152 extending radially outwardly from portion 142 and terminating at its radially outer edge in an inturned edge portion 154. Portion 154 defines an annular seat for seating coaction with the outer periphery of combustor forward section 38, as defined by the free edge of outer portion 46.

A nozzle plate 156, somewhat similar in design and relative location to diffuser plate 118, is secured to housing portion 152 by bolts (not shown). Nozzle plate 156 includes an outer, annular nozzle portion 155 defining a plurality of circumferentially spaced radially extending nozzle vanes 157 projecting in cantilever fashion from the base section of portion 155, and a central hollow hub portion 159 encircling central shaft member 26 and extending axially inwardly from nozzle portion 155. The axially inner ends of hub portions 132 and 159 are axially spaced to expose radial ports 34 and allow slinging delivery of fuel into the combustor chamber. Nozzle portion 155, in coaction with the confronting annular surface of housing portion 152, provides a plurality of radially extending, circumferentially spaced turbine inlet passages 158 defined between adjacent vanes 157.

The radially inner periphery of combustor rearward section 40, as defined by the inturned axially inner edge of portion 78, seats on hub portion 159 and defines an annular air space between portion 78 and hub portion 159. The radially outer edge of nozzle portion 155 is inturned to define an annular seat for seating coaction with the outer periphery of combustor section 40, as defined by the free edge of outer portion 84. A number of screws 160 projecting through holes 162 in section 40 secure section 40 to plate 156. As viewed in FIG. 1, an annular air space exists between rearward section 40 and nozzle portion 155 of nozzle plate 156; this space communicates with the passages and louvers in section 40 and with radially extending passages 164 in hub portion 159 which open into labyrinthian seal 166 on shaft 14 adjacent hub portion 159. Seal 166 is intended to prevent a flow of air between shaft 14 and hub portion 159.

An annular rear housing 168 is seated concentrically within inner portion 146 of exhaust housing 138 and terminates adjacent the turbine end of shaft assembly 14. Seated concentrically within bearing housing 168 is an annular birdcage bearing support 170 having an annular radial portion 172 and an annular axial portion 174 extending in cantilever fashion from radial portion 172. A plurality of axially extending rectangular slots are formed around axial portion 174 to define a plurality of axially extending ribs which serve to provide flexibility to support 170. Axial portion 174 is spaced from housing 168.

A ball bearing 176 is received in the outer end of axial portion 174; bearing 176 journally receives the stepped down end portion of shaft assembly 14 to support shaft assembly 14 at one end outboard of the turbine rotor. A bearing retainer 178 is interposed between the inner race of bearing 176 and a shoulder on shaft assembly 14. The outer race of bearing 176 seats against an annular projection on axial portion 174.

An annular fuel inlet housing 180 is seated concentrically within bearing housing 168. A fuel seal 182 has opposed ends respectively seated in opening 35 in the shaft assembly and in a central fuel inlet passage 184 in fuel inlet housing 180. Seal 182 is intended to direct fuel from passage 184 to passage 32 while precluding leakage of fuel into bearing cavity 186. Lubricating oil is directed to and around bearing 176 by introducing it into bearing cavity 186 through a passage 188 and removing it through a passage 190. Appropriate connections to fuel and oil supplies are contemplated but not illustrated.

A cup-shaped intake transmission housing 198 is secured to the air intake end of main housing 94 by a plurality of bolts 192 passing through mating lugs 194 and 196. Together with intake housing 94, transmission housing 198 provides annular support surfaces for the automotive type annular air filter 20. An annular curvilinear portion 200 of transmission housing 198 encircles shaft assembly 14 and defines a portion of compressor intake passage 116 and a portion of forward bearing cavity 202. Housing 198 is preferably formed as an aluminum die casting.

A front bearing housing plate 204 is secured to transmission housing 198 by a number of bolts 206. An annular flanged birdcage support 208 is secured to bearing housing 204 by bolts 210 projecting through the flange 212. Birdcage support 208 is similar to rear birdcage 172 and has a plurality of rectangular shaped slots defining ribs located around the annular axially extending portion 214 to provide flexibility. The axial portion 214 is spaced from the opening 216 in bearing housing 204 and is cantilever. A second birdcage 218 has an annular radially extending flange on one end secured to the outer movable end of birdcage support 208 and an annular radially extending flange on the other end contacting the outer race of front ball bearing 220 on the transmission side of engine 10. The inner race of front bearing 220 contacts a shoulder on shaft assembly 14 on the power side 12 of engine 10.

The double birdcage arrangement provided by birdcages 170 and 208 and 218 retains shaft assembly 14 against axial movement but still provides a degree of radial movement at each end. By proper selection of the rectangular shaped slots in the axial portions of birdcages 170, 208 and 218, the critical vibrational frequencies of the assembled shaft can be removed from the operating range of engine 10. The outboard location of the bearings 176 and 220 relative to shaft assembly 14 further permits rapid bearing replacement without disassembling engine 10.

Appropriate seals, such as annular rubber rings, may be interposed between shaft assembly 14 and various portions of the housings. These seals are intended to prevent oil from flowing from bearing cavities 186 and 202 into the gaseous streams of engine 10.

Lubrication of front bearing 220 is accomplished by feeding oil under pressure through passage 222 and 224 respectively located in the center of gear 226 and in front bearing housing 204. Incoming oil passes through the slots in birdcages 208 and 218 and into bearing cavity 202. The oil is thereafter free to flow from bearing cavity 202 through front bearing 220 into transmission 16.

Transmission 16 includes a gear box cover 228 secured to housing 198 to form a gear cavity 230. A pinion 232 is secured by a suitable nut to the free end of shaft assembly 14 outboard of bearing 220. Pinion 232 meshes with a first set of teeth 234 on a double gear 226 mounted on a shaft 236 journalled in housing members 204 and 228. A second, smaller set of teeth 238 on the hub portion of double gear 226 meshes with an output gear 240 secured to an output shaft 242. Gears 226 and 240 are preferably formed of powdered iron and pinion 232 of machined nitrided steel.

Output shaft 242 is supported on opposite sides of output gear 240 in housing members 204 and 228. A ball bearing 243 has its outer race engaged with a surface of a cup-shaped protusion 244 of housing 204 and its inner race contacting shaft 242. A bearing collar 246 retains bearing 243 in place and has opposed "L" shaped cavities 248 and 250 to direct oil coming from bearing 220 through bearing 243. A sleeve 252 is used to support shaft 242 in housing member 228. Proper spacers and seals illustrated but not numbered are respectively used to prevent movement of the gears and shafts and stop oil leakage through transmission 16.

As oil is added to lubricate bearings 220 and 243, oil begins to fill gear cavity 230. The height of this oil is controlled by removing oil through outlet port 254 in housing 198. It should be appreciated that a pump can be provided to circulate oil from outlet port 254 to inlet port 188 through bearing 176 out of port 190 into passages 222 and 224 through bearings 220 and 243 and back into gear cavity 230. The oil level in gear cavity 230 should be maintained in accordance with acceptable gear reducer standards.

A drain plug 256 is located in housing 94 and projects into combustion chamber 36 through forward section 38. Plug 256 is located at the lowest part of combustion chamber 36 when engine 10 is in an operative position. A plurality of spaced drain holes 258 are provided between forward section 38 and surface 92 and communicate with a cup-like reservoir 260 in plug 256. A retaining ring 262 encloses the open end of reservoir 260 and has a fuel drain passage 261 communicating with combustion chamber 36 and reservoir 260. Reservoir 260 communicates with the atmosphere through a drain passage 264. Passages 264 is opened and closed by a stem valve 266 having a closing ring which restricts drain passage 264 and is normally concave and opens toward combustion chamber 36 and a cylindrical shaped stemm located in an opening in plug 256. When engine 10 is operating, the flow caused by pressure created by incoming air forces the closing ring in the area of drain passage 264 flat to seal drain passage 264. Upon a reduction of pressure, which occurs when engine 10 is turned off, the closing ring returns to its concave configuration to permit noncombusted liquid fuel in combustion chamber 36 and housing 94 to flow into reservoir 260 through passages 261 and holes 258 to be drained from engine 10.

Diametrically opposed from drain plug 256 is a glow plug 268 connected to housing 94 and projecting into combustion chamber 36 through forward section 38. Glow plug 268 comprises an igniter 270 in combustion chamber 36 which is connected to a terminal 272 which is insulated from the main portion of the glow plug. Terminal 272 is intended to be connected to an electrical circuit which will pass a current flow through igniter 270 to make the igniter hot enough to ignite a fuel air mixture in combustion chamber 36.

To operate engine 10, a power source, such as an electric motor, is connected to output shaft 242 to rotate shaft assembly 14. Rotation of compressor rotor 24 forces air through air filter 20 into air inlet 18 and then into compressor inlet passage 116. The incoming air is forced through compressor rotor 24 and then through passages 130 defined by diffuser portion 119 of diffuser plate 118. The compressed air encircles forward and rearward sections 38 and 40 of combustion chamber 36 and fills the annular cavity 274 defined by exhaust housing 138 and the adjacent portion of housing intake 94. The thimble burners 74 direct the incoming air between rearward section 40 and nozzle plate 156. The air is forced through the various louvers and passages into combustion chamber 36 to create a swirling, turbulent air mass.

At the same time air is being forced through compressor rotor 24, fuel is being injected in a liquid form into fuel inlet 184. The rotation of shaft assembly 14 forces the incoming fuel radially outwardly against the conical wall of fuel supply passage 32 and drives the fuel into the portion of passage 32 located in slinger ring 26; the fuel is thereafter slung radially outwardly through slinger ports 34 into combustion chamber 36. After engine 10 has been operated for a period of time, the fuel vaporizes during its passage through passage 32. The fuel passing through and vaporizing in passage 32 during engine operation functions to cool bearing 176, turbine rotor 28, and slinger ring 26. This cooling action is important to the efficient operation of engine 10 and enables the use of relatively inexpensive materials for the various cooled components.

The vaporized fuel and air mixes in combustion chamber 36 and is ignited by glow plug 268. The burnt mixture expands and exhausts through the passage defined by outer portions 46 and 84 of forward and rearward sections 38 and 40. the burnt gases pass around thimble burners 74 heating these thimbles. Air passing through these thimbles from the compressor rotor 24 to combustion chamber 36 is thereby heated prior to combustion. The passage of such incoming air from compressor rotor 24 through thimbles 74 also cools thimbles 74 and thereby cools the exhaust gases. The exhaust gases are further cooled by the introduction of compressor air through dilution passages 76 and 110 in sections 38 and 40. The exhaust gases then pass through passages 158 in nozzle plate 156, through the blades on turbine rotor 28 to drive shaft assembly 14, and out exhaust passage 144.

The air in cavity 274, due to the cavity configuration, slowly moves along the walls of housing 94 and 138 and absorbs heat to thereby cool the housings. The heated gas in the cavity reenters the incoming air flow to combustion chamber 36 to be mixed with fuel and burned.

When the shaft assembly 14 reaches an rpm to support self-sustained operation, the input drive to output shaft 242 is removed. By varying the fuel input thereafter, the speed of engine 10 can be controlled. An appropriate fuel control system (not shown) is used to monitor fuel flow. The air inlet 18 provided between transmission 16 and power section 12 reduces heat transfer between these two components. Transmission 16 may therefore be designed in a manner that will reduce costs, such as choosing materials that may be used in a cooler environment than would exist if the air inlet did not separate the two components. Various other design characteristics which have been previously described and/or illustrated further aid the objective of reducing the cost of engine components as well as the objective of improving engine efficiency.

What is claimed is:

1. In a gas turbine engine having a turbine rotor axially spaced from a compressor rotor by an annular combustion chamber, said rotors and combustion chamber being in fluid communication, and a housing encircling said rotors and said combustion chamber and being spaced from said combustion chamber, said housing having an upper portion and a lower portion, a drain plug located in said lower portion and comprising:

a body portion transversing said space between said housing and said combustion chamber, said body portion including 1. a reservoir,
2. a first passage communicating with said reservoir and said combustion chamber,
3. a second passage communicating with said reservoir and said space between said housing and said combustion chamber, and
4. a third passage communicating with said reservoir and the exterior of said housing; and valve means normally spaced from and restricting said third passage and movable in response to a flow of gas through said third passage caused by an increase in pressure in said space between said housing and said combustion chamber above ambient pressure at the exterior of said housing to seal said third passage.

2. A gas turbine engine comprising:

A. a shaft assembly having a central axis and including
1. a compressor, and
2. a turbine discharging toward one end of the shaft assembly;
B. a liner defining a combustion chamber in fluid communication with said compressor and said turbine;
C. a housing including
1. a main body portion generally enclosing said shaft assembly,
2. an exhaust end structure defining
 a. an annular, axially extending discharge passage communicating at one end with the outlet of said turbine and diverging radially outwardly therefrom, and
 b. an axially extending cavity centrally within said discharge passage opening to atmosphere at the end thereof remote from said turbine outlet;
D. a bearing assembly supported by said housing and positioned within the open end of said cavity, said bearing assembly including
1. an annular bearing housing positioned within the open end of said cavity and defining an inner axially extending cavity and an annular insulating air space opening to atmosphere between an inner peripheral surface of said exhaust end structure and an outer peripheral surface of said bearing housing,
2. an axially extending annular bearing support secured at one end to said bearing housing and spaced throughout its remaining axial extension from said bering housing, and
3. a bearing positioned within said inner cavity, journaling said shaft assembly, and supported by the other end of said bearing support; and
E. sealing means located along said shaft assembly between said bearing and said turbine outlet providing a gas seal between said annular discharge passage and said bearing assembly;
F. said inner cavity opens to atmosphere at the end outboard from said turbine outlet;
G. said shaft assembly terminates within said inner cavity outboard of said bearing;
H. a housing end member is positioned in the open end of said inner cavity and closes said inner cavity to define a lubricant chamber in said bearing housing surrounding said shaft assembly end;
I. said one end of said bearing support is interposed between said end member and said bearing housing; and
J. means are included to provide a flow of lubricant to end from said lubricant chamber.

* * * * *

UNITED STATES PATENT OFFICE
CERTIFICATE OF CORRECTION

Patent No. 4,034,560  Dated 7/12/77

Inventor(s) Richard Chute

It is certified that error appears in the above-identified patent and that said Letters Patent are hereby corrected as shown below:

| | |
|---|---|
| Col. 1, line 68: | "case" should read "cast". |
| Col. 2, line 13: | "includes" should read "include". |
| Col. 3, line 51: | "line" should read "liner". |
| line 54: | Insert "inner" after "radially". |
| Col. 5, line 46: | Before "surface" insert "end". |
| Col. 6, line 11: | "are" should read "and". |
| line 29: | Insert after "140."--Exhaust -- housing 138 includes a radially extending portion 139 having---and before "an". |
| line 44: | Before "exhaust" insert-Radially extending portion 139 of---' |
| Col. 7, line 19: | After "rear" insert "bearing". |
| line 51: | After "cup-shaped" delete "intake". |
| Col. 9, line 16: | "stemm" should read "stem". |
| line 47: | "housing intake" should read "intake housing". |

Signed and Sealed this

Twenty-second Day of November 1977

[SEAL]

Attest:

RUTH C. MASON
*Attesting Officer*

LUTRELLE F. PARKER
*Acting Commissioner of Patents and Trademarks*